Figure 3:
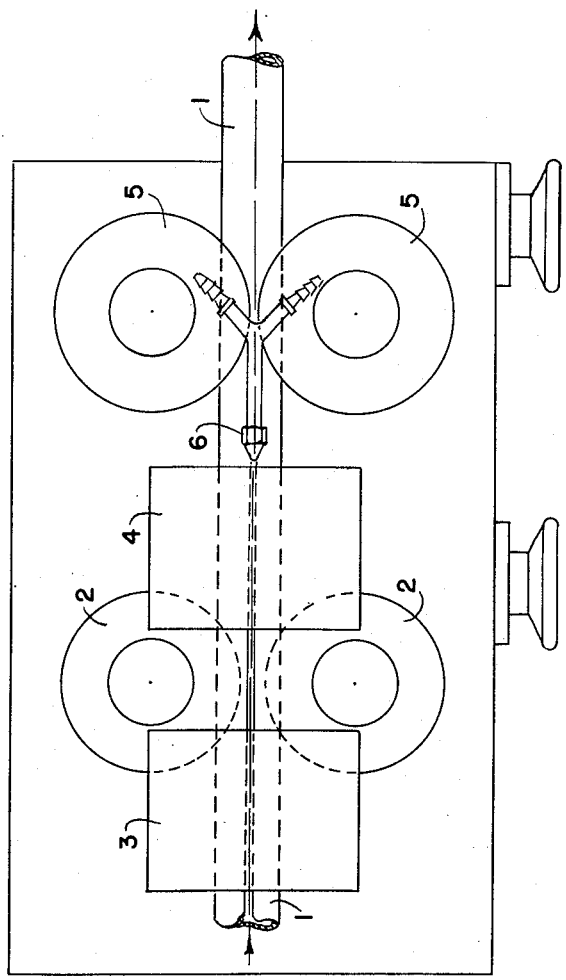

Jan. 8, 1957
H. MELCHER
2,776,474
METHOD OF CONTINUOUSLY PRODUCING WELDED PIPE
Filed Aug. 9, 1954
2 Sheets-Sheet 1
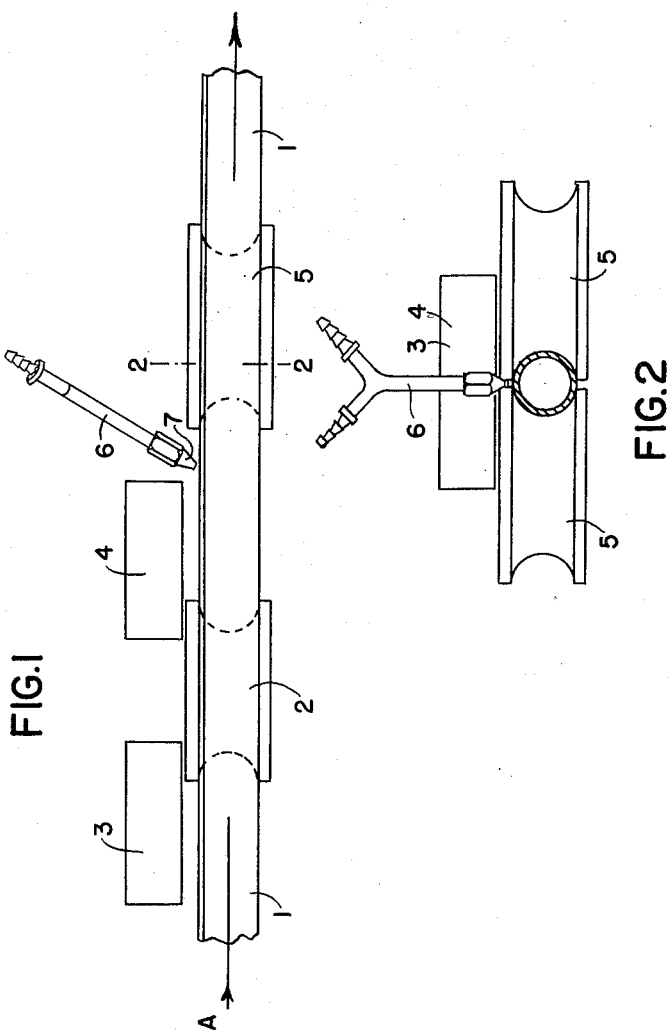
Hans Melcher
INVENTOR.
BY
ATTORNEY Jan. 8, 1957　　　　H. MELCHER　　　2,776,474
METHOD OF CONTINUOUSLY PRODUCING WELDED PIPE
Filed Aug. 9, 1954　　　　　　　　2 Sheets-Sheet 2

Hans Melcher
INVENTOR.

BY
ATTORNEY

United States Patent Office 2,776,474
Patented Jan. 8, 1957

2,776,474

METHOD OF CONTINUOUSLY PRODUCING WELDED PIPE

Hans Melcher, Mulheim an der Ruhr, Germany, assignor to Friedrich Kocks, G. m. b. H., Dusseldorf, Germany Application August 9, 1954, Serial No. 448,709

2 Claims. (Cl. 29—477.7)

This invention relates to a process and device for the continuous production of pipes welded from steel bands.

A process is known according to which welded pipes are made from endless steel bands, which is called the Fretz-Moon-Process, in which the edges of the band heated to 1200° C. in a furnace passed by said band, are blown with air in order to increase their temperature to the degree necessary for pressure welding. It is a fact, that the pressures during welding can be kept the lower, the higher the temperature is of the band edges, the union at the welding seams being complete and flawless.

In induction welding, other factors are of importance. In that process, only a narrow area lying around the edges of the band, which has been shaped to form a split tube, is heated to a temperature making pressure welding possible. Since the split tube is not heated over the larger part of its circumference, it presents a higher resistance to a change of its shape as compared to the resistance of the heated edges. It is, therefore, possible to apply a much larger pressure with welding rollers arranged in series, than with a split tube which is heated in its entirety to a temperature exceeding 1000° C.

In the accompanying drawings the device for carrying out the process according to the invention is diagrammatically illustrated, but it should be understood that many changes can be made in the device and the process without departing from the spirit of the present invention.

In the drawings, Fig. 1 is an elevation of the split tube, which is partly shown cut open, with blowing device, inductors, guiding and welding rollers.

Fig. 2 is a section along 2—2 of Fig. 1, through the axes of the welding rollers shown in that figure; and Fig. 3 is a plan view of the device.

In the drawings, the split tube 1 pre-formed from a steel band enters the device in the direction of arrow A and passes first through a pair of guide rollers 2. During the passage, the edges of tube 1 are heated by inductors 3 and 4 to a temperature of about 1300° C. Next in line, a pair of pressure-welding rollers 5 is arranged. Shortly before reaching these rollers, the tube passes a blowing device 6, comprising a nozzle 7 through which air or a mixture of air and oxygen is blown against the edges of the tube, whereby the temperature is raised from 1300° C. to about 1450° C. to 1600° C., i. e. welding temperature is reached. Immediately thereafter, the tube passes through rollers 5, which perform pressure-welding of the metal edges.

The device and process according to the invention permit to increase the output resulting from welding by induction heating alone, by about 50%.

It has been established that induction-pressure-welding could be carried out with much greater efficiency and better welded joints if it were possible to increase the temperature of the edges to be welded in an economical manner. This cannot be done with electrical energy in existing plants. An attempt to increase the output of the generators does not lead to a solution economically feasible.

It is the object of the present invention to provide a process for the continuous production of welded pipes from steel bands by induction heating, which spells an improvement over known operations both as to quality of the pipes produced and as to the economy of the operation.

The process according to the invention comprises shaping a sheet into a split tube or pipe and blowing an oxidizing gas, such as air or a mixture of air and oxygen, against the edges of the tube along the slit, whereby the temperature is increased above the one developed in the generator of an induction plant, so that welding temperature will be reached at the edges. By this simple means, the output of an existing induction welding plant can be increased by more than 25%.

By blowing air, or a mixture of air and oxygen, onto the edges of the split tube which has been pre-heated by induction heating, the additional advantage is obtained, that the edges are freed from adhering cinders and other impurities. As a consequence, with high temperatures at the edges, excellent welding results will be produced with comparatively low pressures. Finally, smaller seams will be obtained by this welding method than is possible with the customary pressure welding processes.

I claim:

1. The method of continuously producing welded pipe from a continuous flat length of steel comprising cold forming said steel length into a split pipe, heating by electrical induction the edges only which are split in said cold formed pipe, said induction heating bringing said edges to a temperature of about 1300° C. which is below the welding temperature of the steel of said edges, thereafter blowing an oxygen containing gas against said edges whereby the temperature of said edges is raised to a welding temperature of about 1450°–1650° C., localized at said edges, and immediately thereafter pressure welding said localized heated edges to form continuous lengths of welded pipe seamed at said localized heated edges.

2. The method of continuously producing welded pipe from continuous lengths of steel comprising heating by electrical induction the edges only of cold-form split pipe prepared from said continuous lengths of steel, said induction heating bringing said edges to a temperature of about 1300° C. which is below the welding temperature of the steel of said edges, thereafter blowing an oxygen containing compressed gas against said edges whereby the temperature of said edges, localized at said edges, is raised to a welding temperature of about 1450°–1650° C. and immediately thereafter pressure welding said localized heated edges to form continuous lengths of welded pipe seamed at said localized heated edges.

References Cited in the file of this patent

UNITED STATES PATENTS

| | | |
|---|---|---|
| 386,088 | Ries | July 10, 1888 |
| 2,483,973 | Goettings | Oct. 4, 1949 |
| 2,575,381 | Colby | Nov. 20, 1951 |
| 2,647,982 | Baker | Aug. 4, 1953 |